United States Patent
Bisleri et al.

(10) Patent No.: US 6,828,022 B2
(45) Date of Patent: Dec. 7, 2004

(54) FIRE-RESISTANT AND WATER-RESISTANT HALOGEN-FREE LOW-VOLTAGE CABLES

(75) Inventors: Cesare Bisleri, Cassina de Pecchi (IT); Jean-Hubert Fondeur, Sens (FR)

(73) Assignee: Cables Pirelli, Saint-Maurice (FR)

( * ) Notice: Subject to any disclaimer, the term of this patent is extended or adjusted under 35 U.S.C. 154(b) by 0 days.

(21) Appl. No.: 09/785,557

(22) Filed: Feb. 20, 2001

(65) Prior Publication Data

US 2001/0025720 A1 Oct. 4, 2001

(30) Foreign Application Priority Data

Feb. 21, 2000 (EP) .............................. 00400463

(51) Int. Cl.$^7$ .............................. D02G 3/00; H01B 7/00
(52) U.S. Cl. .................. 428/375; 428/364; 428/368; 174/110; 174/120 R; 524/437
(58) Field of Search ................. 428/364, 368, 428/375, 380; 174/120 R, 110; 524/437

(56) References Cited

U.S. PATENT DOCUMENTS

| | | | | |
|---|---|---|---|---|
| 3,576,940 A | | 5/1971 | Stone et al. ............... 174/113 |
| 4,370,076 A | | 1/1983 | Sullivan et al. ........... 405/132 |
| 4,810,835 A | | 3/1989 | Richter et al. ............ 174/107 |
| 4,853,154 A | * | 8/1989 | Icenogle et al. ........... 252/602 |
| 4,948,669 A | * | 8/1990 | Rolland .................... 428/379 |
| 5,561,185 A | * | 10/1996 | Hashimoto et al. ........ 524/436 |
| 6,162,548 A | * | 12/2000 | Castellani et al. ......... 428/500 |
| 6,255,594 B1 | * | 7/2001 | Hudson ................... 174/121 A |
| 6,339,189 B1 | * | 1/2002 | Caimi ....................... 174/36 |
| 2002/0088642 A1 | * | 7/2002 | Caimi ...................... 174/121 A |

FOREIGN PATENT DOCUMENTS

| | | |
|---|---|---|
| EP | 0 222 683 | 5/1987 |
| EP | 0 362 929 | 4/1990 |
| EP | 0 366 473 B1 | 5/1990 |
| EP | 0 378 259 | 7/1990 |
| GB | 1 480 090 | 7/1977 |
| GB | 2 009 488 A | 6/1979 |
| GB | 2 259 140 A | 4/1981 |
| GB | 2 294 801 | 5/1996 |
| WO | WO 99/05688 | 2/1999 |

\* cited by examiner

*Primary Examiner*—Rena Dye
*Assistant Examiner*—Camie S Thompson
(74) *Attorney, Agent, or Firm*—Finnegan, Henderson, Farabow, Garrett & Dunner, L.L.P.

(57) ABSTRACT

A fire-resistant and water-resistant low-voltage electrical cable including a conductor and a first internal layer to protect it against water based on a polymer compound containing no halogen, crosslinked or not, and a second layer consisting of a blend of a crystalline propylene homopolymer or copolymer and of a copolymer of ethylene and at least one α-olefin, optionally with a diene, and of an agent having fire retardant properties, the ratio of the thicknesses of the outer layer and the internal layer being from 1 to 7.

47 Claims, No Drawings

FIRE-RESISTANT AND WATER-RESISTANT HALOGEN-FREE LOW-VOLTAGE CABLES

BACKGROUND OF THE INVENTION

1. Field of the Invention

The present invention relates to electrical cables, in particular low-voltage electrical cables having improved fire resistance and water resistance.

2. Description of the Prior Art

Fire-resistant cables including polyolefin layers containing an organic halogenide or other fire retardants are known in the art.

The disadvantages of using halogenated flame retardant compounds, in particular in connection with fabrication of the above cables and their possible corrosive effect on metal parts of the equipment, are known in the art.

PCT WO 99/05688 discloses cables with good fire resistance properties, including a layer of crystalline propylene homopolymer or copolymer blended with a copolymer of ethylene with at least one α-olefin and possibly a diene.

The above compounds contain a natural magnesium hydroxide in quantities which confer fire retardant properties on the cables.

The above application mentions the possible use of an internal insulative layer that is relatively thick compared with the layer containing the fire retardant.

European application EP 0 378 259 discloses high-voltage connecting cables including a metal wire surrounded by a first insulative layer from 0.3 to 1.5 mm thick and including a copolymer of propylene and at least one other alkene, the first insulative jacket being covered with a second insulative jacket that is not crosslinked and is from 1.0 to 3 mm thick, containing polyvinyl chloride or a vinyl chloride copolymer. The second jacket includes fire retardant additives.

GB patent 2 294 801 concerns an electrical cable including a conductor embedded in a hydrophobic material and surrounded by a layer of fire retardant material. The cable is used in the field of telecommunications in particular.

However, we have found that using a covering including a layer containing the fire retardant as described in PCT WO 99/05688 makes the water resistance of the cable unsatisfactory, failing to comply with the relevant requirements. Also, when the thick insulative additional layer is used, the cable has fire resistance problems.

We have found that when the cable is live in the presence of moisture the water tends to penetrate the cable and reduce its insulation, leading to breakdown of the cable.

The invention therefore relates to a low-voltage electrical cable, preferably a single-conductor cable, having improved fire resistance and flame propagation resistance, containing no halogenides and complying with IEC standards, the cable having improved water resistance. The combination also aims to improve the mechanical properties of the cable and its resistance to short circuits.

The cable according to the invention must have a fire resistance complying with the following standards: IEC 332-3c (March 1992), NFEN 50 266-2 section 4 of February 1999, and NFC 32070 section 2 and 2.2 of March 1991, and the additions A1 of July 1992 and A2 of November 1993, and a water resistance such that it resists salt water (10 g/l NaCl) at 60° C. at a voltage of 220 V DC for at least ten days, complying with NFC-32-201-2, art. 2.5 of October 1998 and NFC-32-201-1 table 3, section 5 of October 1998.

We have discovered that the above problems can be solved by developing a cable featuring a double layer, the layers having relative thicknesses such that the cable has at one and the same time improved fire resistance properties and improved water resistance properties, in both cases complying with the aforementioned standards.

SUMMARY OF THE INVENTION

The invention provides a fire-resistant and water-resistant low-voltage electrical cable including a conductor and a first internal layer to protect it against water based on a polymer compound containing no halogen, crosslinked or not, and a second layer consisting of a blend of a crystalline propylene homopolymer or copolymer and of a copolymer of ethylene and at least one α-olefin, optionally with a diene, and of an agent having fire retardant properties, the ratio of the thicknesses of the outer layer and the internal layer being from 1 to 7.

Depending on the cross section of the conductor, the internal layer preferably has a thickness from 0.05 to 1 mm and the outer layer preferably has a thickness from 0.25 to 2 mm.

In accordance with the invention, the inner layer covering the conductor is a layer of an olefin polymer containing no halogenide, crosslinked or not, preferably chosen from polyolefins and more particularly olefin homopolymers or copolymers, copolymers of an olefin with ethylenically unsaturated esters, polyesters, polyethers, polyether/polyester copolymers and blends thereof.

The polymers can include polyethylene and in particular linear low-density polyethylene (LLDPE), polypropylene, a thermoplastic propylene-ethylene copolymer, ethylene-propylene rubbers (EPR) or ethylene-propylene-diene rubbers (EPDM), natural rubbers, butyl rubbers, ethylene/vinyl acetate (EVA) copolymers, ethylene/methacrylate (EMA) copolymers, ethylene/ethyl acrylate (EEA) copolymers, ethylene/butyl acrylate (EBA) copolymers and ethylene/α-olefin copolymers.

The fire retardant outer layer is preferably a blend of a crystalline propylene homopolymer or copolymer and of a copolymer of ethylene with an α-olefin, possibly with a diene, said copolymers having a narrow molecular weight distribution, characterized by a molecular weight distribution index, defined as the ratio of the weight-average molecular weight $M_w$ to the number-average molecular weight $M_n$, less than 5, preferably from 1.5 to 3.5, as determined by gel permeation chromatography and a fire retardant.

The α-olefins can be α-olefins with the formula:

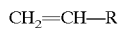

$$CH_2=CH-R$$

where R is a linear or branched alkyl radical having from 1 to 10 carbon atoms.

In particular, they can be propylene, 1-butene, 1-pentene, 4-methyl-1-pentene, 1-hexene, 1-octene, 1-dodecene, etc.

The α-olefins are preferably the propylene, 1-hexene and 1-octene radicals.

When the α-olefin is propylene, the copolymers can be characterized by a high domain regularity in the sequence of monomer units. In particular, these copolymers have a number of $CH_2$ groups in the $-(CH_2)_n$-sequences, where n is an integer, relative to the total number of $CH_2$ groups less than 5%/mol, preferably less than 1%/mol. This can be determined by NMR analysis using carbon-13. This is known in the art.

When the comonomer is a diene, it generally has 4 to 20 carbon atoms and is preferably chosen from conjugated or unconjugated linear diolefins such as, for example, 1,3-butadiene, 1,4-hexadiene or 1,6-octadiene; monocyclic or polycyclic dienes such as, for example, 1,4-cyclohexadiene, 5-ethylidene norbornene, 5-methylene-2-norbornene, etc.

In accordance with the invention, the composition of the outer layer is obtained by using blends of the two polymers containing from 5 to 60 wt % and preferably from 10 to 40 wt % of a crystalline propylene homopolymer or copolymer (a) and from 40 to 95 wt % and preferably from 60 to 90 wt % of the ethylene/α-olefin copolymer (b) relative to the total weight of the polymer components of the compound.

The compounds preferably contain, as fire retardants, natural or synthetic aluminum and/or magnesium hydroxide. The natural magnesium oxide can be obtained, for example, by grinding minerals based on magnesium hydroxide such as brucite. Brucite can generally be obtained mixed with other minerals such as calcite, aragonite, talc or magnesite, often in laminar form between silicate deposits, especially in serpentine asbestos, chlorites or schists.

In accordance with the invention, the brucite is ground employing a wet or dry technique known in the art and in the presence of additives such as polyglycols.

The specific surface area of the ground product is generally from 3 to 20 $m^2/g$ and preferably from 6 to 15 $m^2/g$.

The ground product can be subjected to a separation process to obtain a range of particle sizes from 1 to 15 μm and preferably from 1 to 5 μm. The particle distribution is such that less than 10% of the total number of particles have a particle size less than 1.5 μm and less than 10% of the total number of particles have a particle size greater than 20 μm.

If the fire retardant is of natural origin, it may contain various impurities derived from oxides and/or hydroxides of metals such as iron, manganese, calcium, silicon, vanadium, etc.

Magnesium hydroxide obtained by chemical methods known in the art can also be used, for example by basic precipitation from an aqueous solution containing the $Mg^{2+}$ ion.

The magnesium hydroxide can be used as such or can be treated with saturated or unsaturated fatty acids containing 8 to 24 carbon atoms or metal salts thereof, for example with oleic acid, palmitic acid, stearic acid, isostearic acid, lauric acid, magnesium or zinc stearate, magnesium or zinc oleate.

The particles can also be surface-treated with coupling agents such as organic titanates or silanes, such as vinyltriethoxysilane, vinyltriacetylsilane, tetraisopropyltitanate, tetra-n-butyl titanate, etc.

The copolymers (b) of the outer layer are preferably copolymers of ethylene with at least one $C_3$-$C_{12}$ α-olefin, possibly a diene, these copolymers having elastomeric properties characterized by:

an enthalpy of melting less than 35 J/g and preferably less than 30 J/g;

an intrinsic viscosity (η) generally greater than 1.0 dl/g, and preferably greater than 2.0 dl/g, determined in tetraline at 135° C.;

a Mooney ML (1+4) viscosity at 125° C., measured as per ASTM standard D 1646, generally greater than 10 and preferably from 20 to 90;

a solubility in pentane at 20° C. generally greater than 80 wt %; and a permanent set of less than 30% measured one minute after removal of the stress, which allowed elongation to 200% as per ASTM standard D 412.

These copolymers generally have the following composition: 35 to 90 mol % of ethylene 10 to 65 mol % of α-olefin, preferably propylene, 0.10 mol % of a diene, preferably 1,4-hexadiene or 5-ethylidene norbornene.

When the α-olefin is propylene, the monomer composition is preferably as follows: 55 to 80 wt % and preferably 65 to 75 wt % of ethylene, 20 to 45 wt % and preferably 25 to 35 wt % of propylene; 0 to 10 wt % and preferably 0 to 5 wt % of a diene (preferably 5-ethylene-2-norbornene).

A second family of copolymers that can be used in the outer layer are copolymers of ethylene with at least one $C_4$-$C_{12}$ α-olefin, preferably 1-octene, and possibly a diene, characterized by:

a density from 0.86 to 0.90 $g/cm^3$;

an enthalpy of melting from 30 to 60 J/g;

a melt-flow index measured as per ASTM standard D 1238 L from 0.1 to 30 g/10 minutes, preferably from 0.5 to 5 g/10 minutes.

These copolymers preferably have the following composition: 75 to 97 mol % and preferably 90 to 95 mol % of ethylene; 3 to 25 mol % and preferably 5 to 10 mol % of α-olefin and 0 to 5 mol % and preferably 0.2 mol % of a diene.

The crystalline propylene homopolymers or copolymers generally have an enthalpy of melting greater than 75 J/g and preferably greater than 85 J/g. They are preferably chosen from:

isotactic propylene homopolymers having an isotactic index greater than 80, preferably greater than 90 and in particular greater than 95;

propylene homopolymers obtained using metallocene catalysts, having an mmmmm pentad concentration greater than 90% as determined by NMR analysis using carbon-13;

copolymers of propylene with ethylene or an α-olefin having from 4 to 10 carbon atoms and an ethylene and/or α-olefin concentration less than 10 mol %;

heterophase propylene copolymers which can be obtained by block polymerization of propylene and mixtures of propylene with ethylene and/or an α-olefin having 4 to 10 carbon atoms and containing at least 70 wt % of propylene homopolymers and crystalline ethylene/propylene copolymers with an isotactic index greater than 80, the remainder consisting of elastomeric ethylene/propylene copolymers with a propylene content from 30 to 70 wt %; and crystalline propylene homopolymers or copolymers having a syndiotactic structure that can be obtained using metallocene catalysts.

The quantity of magnesium hydroxide used as a fire retardant is finally from 10 to 90 wt % and preferably from 30 to 80 wt % relative to the total weight of the compound.

Other fillers having flame retardant properties can be used, such as aluminum hydroxide or aluminum trihydrate ($Al_2O_3.3H_2O$) or one or more oxides or inorganic salts such as $CoO$, $TiO_2$, $Sb_2O_3$, $ZnO$, $Fe_2O_3$, $CaCO_3$ or mixtures thereof.

As indicated above, to improve the compatibility of the magnesium hydroxide with the polymer matrix, coupling agents can be used to improve the interaction between the hydroxyl groups of the magnesium hydroxide and the polyolefin chains.

The coupling agents are preferably chosen from unsaturated silane derivatives, preferably silanes containing at least one ethylenically unsaturated group: epoxides containing an ethylenically unsaturated group, monocarboxylic acids or preferably dicarboxylic acids having at least one ethylenically unsaturated group or derivatives thereof, such as anhydrides or esters.

The silanes include γ-methacryloxypropyltrimethoxysilane, methyltriethoxysilane, tris-(2-methoxyethoxy)methylsilane, dimethyldiethoxysilane, tris-(2-methoxyethoxy)vinylsilane, vinyltrimethoxysilane, vinyltriethoxysilane, octyltriethoxysilane, isobutyltriethoxysilane, isobutyltrimethoxysilane and mixtures thereof.

The epoxides include glycidyl acrylates, glycidyl methacrylate, the monoglycidyl ester of itaconic acid, the glycidyl ester of maleic acid, vinyl glycidyl ether, allyl glycidyl ether or mixtures thereof.

The monocarboxylic or dicarboxylic acids including an ethylenically unsaturated group include maleic acid, maleic anhydride, fumaric acid, citraconic acid, itaconic acid, acrylic acid, methacrylic acid, their esters and anhydrides or mixtures thereof, maleic anhydride being preferred.

The coupling agent is generally used in quantities from 0.01 to 5 wt % and preferably 0.05 to 2 wt % relative to the total weight of the base polymer blend.

These compounds can also contain antioxidants, processing aids, lubricants, pigments and other fillers.

The compounds are prepared by mixing the polymers and the additives by methods known in the art.

The layers can be applied by extrusion, for example, or by extrusion in two separate stages, consisting in extruding the inner layer onto the conductor in a first stage and the outer layer onto the inner layer in a second stage.

In a preferred embodiment the two layers are applied in a single stage using a so-called "tandem" process in which two separate extruders in series are used or by coextrusion using a single extrusion head.

Cables according to the invention are intended in particular to be used in environments where there are moisture problems or places for which there are special safety conditions in the event of fire, such as public places, storage areas, test areas or working areas likely to receive inflammable products. They have improved short-circuit resistance.

The following examples are intended to illustrate the invention without limiting it.

The following composition was prepared:

TABLE I

| Composition | Weight % |
|---|---|
| Engage 8003 | 20.9 |
| Moplen EP1X35 F | 3.7 |
| Hydrofy C. 1.5 S | 73.3 |
| Irganox MD 1024 | 0.074 |
| Irganox 1010 | 0.20 |
| Stearic acid | 0.37 |
| VTMOEO silane | 0.74 |
| Peroximon DC | 0.074 |

The cable had a cross section of 1.5 mm$^2$ and a nominal total insulation thickness of 0.7 mm.

TABLE II

| Sample | A | B | C |
|---|---|---|---|
| Composition (Table I) (outer layer - mm) | 0.7 | 0.5 | 0.2 |
| Escorene LL 1004 (inner layer - mm) | 0 | 0.2 | 0.5 |
| Tensile strength (MPa)* | 12.2 | 14.2 | 17.6 |
| Elongation at break (%)** | 110 | 170 | 210 |
| Aging in salt water** (10 days) (NF-C 32-201-2) | no | yes | yes |
| Fire propagation test (IEC 332.3C of March 1992) | yes | yes | no |
| Elongation at break | no | yes | yes |
| Stress at break | no | yes | yes |

*As per standard NF-C 32-201-1, table 1 section 1.1 column 6, October 1998.
**As per standard NF-C 32-201-2, art. 2–5, October 1998 and NF-C 32-201-1, table 3 section 5, October 1998.

Examples A and C are comparative.

Engage 8003 is an ethylene/1-octene copolymer obtained by metallocene catalysis.

The ratio by weight of ethylene/1-octene was equal to 82/18 (5.5 mol % of 1-octene, density=0.885 g/cm$^3$; MFI= 1.0 g/10 minutes; CDI>70%; ΔH2m=55.6 J/g).

Moplen (EP1X35 HF) is a crystalline propylene/ethylene copolymer (d=0.900 g/cm$^3$; MFI=9.0 g/10 minutes; $T_m$=154° C.; ΔH2m=90.6 J/g).

Hydrofy G 1.5 S is a magnesium hydroxide from SIMA surface-treated with stearic acid and has an aqueous extract conductivity of 290 μS/cm, a specific surface area of 10.4 m$^2$/g; and a particle size distribution expressed in μm of:

TABLE III

| 10% | 50% | 80% |
|---|---|---|
| 0.7 (average) | 2.1 | 6.4 |

Irganox MD 1024 is an antioxidant from CIBA with the formula;

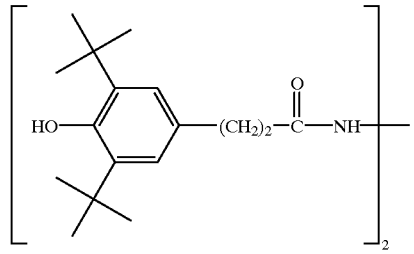

Irganox 1010 is an antioxidant from CIBA having the formula;

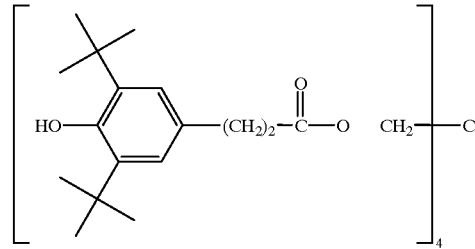

VTMOEO silane is tris-(2-methoxyethoxy)vinylsilane with the formula CH$_2$=CH—Si (OCH$_2$H$_4$OCH$_3$)$_3$ with a purity of not less than 99 wt %.

Peroximon DC is dicumyl peroxide with a purity of not less than 99 wt % and the following formula:

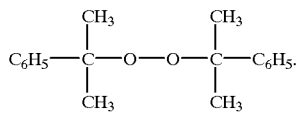

What is claimed is:

1. A fire-resistant and water-resistant low-voltage electrical cable comprising:
   a conductor;
   a first inner layer to protect said conductor against water, said first inner layer comprising a crosslinked or uncrosslinked polymer compound containing no halogen,
   wherein said first inner layer does not comprise an effective amount of a fire retardant agent; and
   an outer layer comprising a blend of a crystalline propylene homopolymer or copolymer, a copolymer of ethylene and at least one α-olefin optionally with a diene, and an agent having fire retardant properties, the ratio of the thicknesses of the outer layer and the inner layer being from 1 to 7.

2. The cable as claimed in claim 1, wherein the thickness of said inner layer is from 0.05 to 1 mm.

3. The cable as claimed in claim 1, wherein the thickness of said outer layer is from 0.25 to 2 mm.

4. The cable as claimed in claim 1, wherein the polymer of said inner layer is a polyolefin, a copolymer of an olefin with an ethylenically unsaturated ester, a polyester, a polyether, a polyether/polyester copolymer or blends thereof.

5. The cable as claimed in claim 4, wherein said polymer is a polyethylene, a polypropylene, a thermoplastic propylene-ethylene copolymer, an ethylene-propylene or ethylene-propylene-diene rubber, a natural rubber, a butyl rubber, an ethylene/vinyl acrylate copolymer, an ethylene/ethyl acrylate copolymer, an ethylene/butyl acrylate copolymer, an ethylene/α-olefin copolymer or blends thereof.

6. The cable as claimed in claim 1, wherein said outer layer comprises a crystalline propylene homopolymer or copolymer, or a polymer having an enthalpy of melting greater than 75 J/g.

7. The cable as claimed in claim 1, wherein the homopolymer, copolymer, or polymer has an enthalpy of melting greater than 85 J/g.

8. The cable as claimed in claim 1, wherein a second copolymer in said outer layer is a copolymer with a narrow molecular weight distribution and having a molecular weight distribution index less than 5 as determined by gel permeation chromatography.

9. The cable as claimed in claim 1, wherein said α-olefin is propylene, 1-butene, 1-pentene 4-methyl-1-pentene, 1-hexene, 1-octene, or 1-dodecene.

10. The cable as claimed in claim 1, wherein said optional diene is a linear conjugated, or unconjugated diolefin.

11. The cable as claimed in claim 10, wherein the diene is 1,3-butadiene 1,4-hexadiene, 1,6-octadiene, a monocyclic diene or a polycyclic diene.

12. The cable as claimed in claim 1, wherein said agent having fire retardant properties is magnesium hydroxide, aluminum hydroxide, or a mixture thereof.

13. The cable as claimed in claim 12, wherein said magnesium hydroxide is present in said outer layer in proportions from 10 to 90 wt %.

14. The cable as claimed in claim 12, wherein said magnesium hydroxide is used with at least one coupling agent to improve interaction between said magnesium hydroxide and said olefin polymer.

15. The cable as claimed in claim 14, wherein said coupling agent is an unsaturated silane, an ethylenically unsaturated epoxide, an ethylenically unsaturated monocarboxylic or dicarboxylic acid, or their anhydrides or esters.

16. A method of manufacturing a fire-resistant and water-resistant low-voltage electrical cable comprising covering a conductor with a first inner layer to protect said conductor against water, said first inner layer comprising a crosslinked or uncrosslinked polymer compound containing no halogen; and covering said first inner layer with a second layer comprising a blend of a crystalline propylene homopolymer or copolymer, a second copolymer of ethylene and at least one α-olefin optionally with a diene, and an agent having fire retardant properties, the ratio of the thicknesses of the outer layer and the inner layer being from 1 to 7.

17. The method as claimed in claim 16, wherein the thickness of said inner layer is from 0.05 to 1 mm.

18. The method as claimed in claim 16, wherein the thickness of said outer layer is from 0.25 to 2 mm.

19. The method as claimed in claim 16, wherein the polymer of said inner layer is a polyolefin, a copolymer of an olefin with an ethylenically unsaturated ester, a polyester, a polyether, a polyether/polyester copolymer, or blends thereof.

20. The method claimed in claim 19, wherein said polymer is a polyethylene, a polypropylene, a thermoplastic propylene-ethylene copolymer, an ethylene-propylene or ethylene-propylene-diene rubber, a natural rubber, a butyl rubber, an ethylene/vinyl acrylate, an ethylene/ethyl acrylate, an ethylene/butyl acrylate copolymer, an ethylene/α-olefin copolymer, or blends thereof.

21. The method as claimed in claim 16, wherein said outer layer comprises a crystalline propylene homopolymer or copolymer, or a polymer having an enthalpy of melting greater than 75 J/g.

22. The method as claimed in claim 16, wherein the homopolymer, copolymer, or polymer has an enthalpy of melting greater than 85 J/g.

23. The method as claimed in claim 16, wherein the second copolymer in said outer layer is a copolymer with a narrow molecular weight distribution and having a molecular weight distribution index less than 5 as determined by gel permeation chromatography.

24. The method as claimed in claim 16, wherein said α-olefin is propylene, 1-butene, 1-pentene, 4-methyl-1-pentene, 1-hexene, 1-octene, or 1-dodecene.

25. The method as claimed in claim 23, wherein said optional diene is a linear conjugated or unconjugated diolefin.

26. The method as claimed in claim 25, wherein the diolefin is 1,3-butadiene, 1,4-hexadiene, 1,6-octadiene, a monocyclic diene, or a polycyclic diene.

27. The method as claimed in claim 16, wherein said agent having fire retardant properties is magnesium hydroxide, aluminum hydroxide, or a mixture thereof.

28. The method as claimed in claim 27, wherein said magnesium hydroxide is present in said outer layer in proportions from 10 to 90 wt %.

29. The method claimed in claim 27, comprising adding at least one coupling agent to the magnesium hydroxide to improve interaction between said magnesium hydroxide and said olefin polymer.

30. The method as claimed in claim 29, wherein said coupling agent is an unsaturated silane, an ethylenically unsaturated epoxide, an ethylenically unsaturated monocarboxylic or dicarboxylic acid, or their anhydrides or esters.

31. A method comprising passing electricity through a cable wherein said cable is a fire-resistant and water-resistant low-voltage electrical cable comprising:
   a conductor;
   a first inner layer to protect said conductor against water, said first inner layer comprising a crosslinked or uncrosslinked polymer compound containing no halogen, wherein said first inner layer does not comprise an effective amount of a fire retardant agent; and
   an outer layer comprising a blend of a crystalline propylene homopolymer or copolymer, a copolymer of ethylene and at least one α-olefin optionally with a diene, and an agent having fire retardant properties, the ratio of the thicknesses of the outer layer and the inner layer being from 1 to 7.

32. The cable as claimed in claim 31, wherein the thickness of said inner layer is from 0.05 to 1 mm.

33. The cable as claimed in claim 31, wherein the thickness of said outer layer is from 0.25 to 2 mm.

34. The cable as claimed in claim 31, wherein the polymer of said inner layer is a polyolefin, a copolymer of an olefin with an ethylenically unsaturated ester, a polyester, a polyether, a polyether/polyester copolymer or blends thereof.

35. The cable as claimed in claim 34, wherein said polymer is a polyethylene, a polypropylene, a thermoplastic propylene-ethylene copolymer, an ethylene-propylene or ethylene-propylene-diene rubber, a natural rubber, a butyl rubber, an ethylene/vinyl acrylate copolymer, an ethylene/ethyl acrylate copolymer, an ethylene/butyl acrylate copolymer, an ethylene/α-olefin copolymer or blends thereof.

36. The cable as claimed in claim 31, wherein said outer layer comprises a crystalline propylene homopolymer or copolymer, or a polymer having an enthalpy of melting greater than 75 J/g.

37. The cable as claimed in claim 31, wherein the homopolymer, copolymer, or polymer has an enthalpy of melting greater than 85 J/g.

38. The cable as claimed in claim 31, wherein a second copolymer in said outer layer is a copolymer with a narrow molecular weight distribution and having a molecular weight distribution index less than 5 as determined by gel permeation chromatography.

39. The cable as claimed in claim 32, wherein said α-olefin is propylene, 1-butene, 1-pentene, 4-methyl-1-pentene, 1-hexene, 1-octene, or 1-dodecene.

40. The cable as claimed in claim 31, wherein said optional diene is a linear conjugated, or unconjugated diolefin.

41. The cable as claimed in claim 40, wherein the diolefin is 1.3-butadiene, 1–4-hexadiene, 1,6-octadiene, a monocyclic diene, or a polycyclic diene.

42. The cable as claimed in claim 31, wherein said agent having fire retardant properties is magnesium hydroxide, aluminum hydroxide, or a mixture thereof.

43. The cable as claimed in claim 42, wherein said magnesium hydroxide is present in said outer layer in proportions from 10 to 90 wt %.

44. The cable as claimed in claim 42, wherein said magnesium hydroxide is used with at least one coupling agent to improve interaction between said magnesium hydroxide and said olefin polymer.

45. The cable as claimed in claim 44, wherein said coupling agent is an unsaturated silane, an ethylenically unsaturated epoxide, an ethylenically unsaturated monocarboxylic or dicarboxylic acid, or their anhydrides or esters.

46. The method of claim 31, wherein said cable is in a wet environment.

47. The method of claim 31, wherein said cable is in a fire safety environment.

* * * * *

UNITED STATES PATENT AND TRADEMARK OFFICE
CERTIFICATE OF CORRECTION

PATENT NO. : 6,828,022 B2
DATED : December 7, 2004
INVENTOR(S) : Cesare Bisleri et al.

Page 1 of 1

It is certified that error appears in the above-identified patent and that said Letters Patent is hereby corrected as shown below:

Column 7,
Line 55, "1-pentene" should read -- 1-pentene, --.
Line 60, "1,3-butadiene" should read -- 1,3-butadiene, --.
Line 61, "diene or" should read -- diene, or --.

Column 8,
Lines 28 and 62, "method claimed" should read -- method as clamed --.

Column 10,
Line 16, "1.3-butadiene," should read -- 1,3-butadiene, --.
Line 16, "1-4-hexadiene," should read -- 1,4-hexadiene, --.

Signed and Sealed this

Tenth Day of May, 2005

JON W. DUDAS
*Director of the United States Patent and Trademark Office*